Patented Jan. 15, 1924.

1,481,197

UNITED STATES PATENT OFFICE.

DAVID F. GOULD, OF CORNWELLS, PENNSYLVANIA, ASSIGNOR TO THE BARRETT COMPANY, A CORPORATION OF NEW JERSEY.

PURIFICATION OF HYDROCARBONS.

No Drawing. Application filed November 3, 1922. Serial No. 598,926.

*To all whom it may concern:*

Be it known that I, DAVID F. GOULD, a citizen of the United States, residing at Cornwells, in the county of Bucks and State of Pennsylvania, have invented certain new and useful Improvements in the Purification of Hydrocarbons, of which the following is a specification.

My invention relates to the process of purifying hydrocarbons, such as naphthalene, fluorene, acenaphthene, etc. It relates more particularly to that part of the refining process in which the hydrocarbon is washed with sulphuric acid in order to remove certain impurities.

My co-pending application, Serial No. 442,821, filed Feb. 5, 1921, patented Jan. 9, 1923; Patent No. 1,441,417, describes a process of crystallizing a molten hydrocarbon after a sulphuric acid washing, and afterwards washing the crystals with water or an aqueous solution. In this process the hydrocarbon is crystallized either by cooling in a pan or similar means or by agitating with hot water and gradually lowering the temperature to below the melting point of the hydrocarbon. The present invention is an additional improvement on the process in connection with the latter step.

I have found that it is advantageous to effect the hot water crystallization, above mentioned, in the presence of alkali more than sufficient to effect complete neutralization of the acids remaining in the washed hydrocarbon. In practicing this, I add a slight excess over the necessary amount of caustic soda, or other alkali, to the vessel in which the crystallization is to be effected and add the washed molten hydrocarbon to this solution, afterwards agitating and cooling the mixture until crystallization is complete. I prefer to bring about this cooling by the gradual addition of cold water although other means may be used. This crystallization in the presence of aqueous alkali takes the place of a subsequent water washing of the crystals, although such subsequent washing with water or other aqueous liquid may also be applied. In performing the neutralization of the hydrocarbon the alkali, if desired, may be added to the molten hydrocarbon, although I prefer to add the hydrocarbon to the alkali, as above described, in order to effect neutralization of the acids in the hydrocarbon more quickly. This neutralization may or may not be preceded by washing the molten hydrocarbon with water or other aqueous solution after the sulphuric acid wash in order to remove the bulk of the acid impurities.

In carrying out this invention, molten impure naphthalene, for example, may be treated with sulphuric acid, the spent acid drawn off, and the treatment repeated as many times as may be necessary to attain the desired degree of purification. The material may then be washed with hot water a number of times whereupon it will be left in an acid condition due to sulphuric acid and sulphonic acids in solution in the naphthalene. While still in the molten state it may be introduced into a tank containing a solution of an alkali slightly in excess of the amount required to effect complete neutralization of the acids. While the mixture is being agitated it may be slowly cooled to cause crystallization in the presence of the alkali. The naphthalene crystals may then be washed with water, if desired, to remove adhering alkaline material and the naphthalene may then be distilled for final purification.

I have found that this process of crystallization in the presence of alkali gives a somewhat more complete removal of the impurities in the hydrocarbon and at the same time makes possible the application of the process in iron apparatus without undue corrosion.

A specific example of the manner in which my process may be applied to naphthalene is as follows:

60,000 pounds of the molten impure naphthalene is washed by agitation with 1450 pounds of 66° Bé. sulphuric acid, the acid being subsequently settled and drawn off. This washing may be repeated as many times as is advisable. Following the drawing off of the last acid the molten naphthalene is washed with 750 gallons of hot water which is settled and drawn off. A second similar water wash is given. The naphthalene, still somewhat acid, is pumped molten into the crystallizing agitator which contains 400 gallons of 27% caustic soda solution. The mixture is agitated and about 6000 gallons of cold water is run in slowly so as to cool the mixture and cause the naphthalene to crystallize. The aqueous liquid is drained away from the naphthalene crystals and the crystals washed with water to remove the caustic soda and other impurities. The naphthalene is then ready for final distillation.

I claim:

1. The process of purifying hydrocarbons which comprises washing the molten hydrocarbon and crystallizing the hydrocarbon in the presence of an aqueous alkali solution.

2. The process of purifying hydrocarbons which comprises washing the molten hydrocarbon with sulphuric acid and crystallizing the hydrocarbon in the presence of an aqueous alkali solution.

3. The process of purifying naphthalene which comprises washing the molten naphthalene with sulphuric acid and crystallizing the naphthalene in the presence of an aqueous alkali solution.

4. The process of purifying naphthalene which comprises washing the molten naphthalene with sulphuric acid, drawing off the spent acid, washing the molten naphthalene with an aqueous liquid and crystallizing the naphthalene in the presence of an aqueous alkali solution.

5. The process of purifying naphthalene which comprises washing the molten naphthalene with sulphuric acid, drawing off the spent acid, washing the molten naphthalene with an aqueous liquid and crystallizing the naphthalene in the presence of caustic soda.

In testimony whereof I affix my signature.

DAVID F. GOULD.